United States Patent Office 2,899,466
Patented Aug. 11, 1959

2,899,466

PURIFICATION OF TEREPHTHALIC ACID

William Alexander O'Neill, Blackley, England, assignor to Imperial Chemical Industries Limited, London, England, a corporation of Great Britain No Drawing. Application November 28, 1955
Serial No. 549,534

Claims priority, application Great Britain December 15, 1954

1 Claim. (Cl. 260—525)

This invention relates to the purification of terephthalic acid.

In the preparation of terephthalic acid by the oxidation of para-substituted aromatic compounds such as para-xylene, the crude terephthalic acid contains small quantities of coloured impurities. When using terephthalic acid in the manufacture of fibre and film-forming polyesters it is essential that the terephthalic acid used be free of coloured impurities, as far as is practically possible, in order to obtain polyesters having good colour.

According to the present invention, we provide an improved process for purifying crude terephthalic acid, which comprises heating terephthalic acid under pressure with water containing an oxidising agent having no oxidising effect on the terephthalic acid itself, preferably a manganese or chromium compound, continuing the heating until solution occurs, cooling the resultant solution and allowing terephthalic acid to crystallise out.

In the preferred process of our invention, we heat the crude terephthalic acid in water containing the oxidising agent to a temperature above 200° C., as the solubility of terephthalic acid in water above 200° C. increases rapidly. We have found that permanganic acid derivatives, especially potassium and sodium permanganates, chromic acid and derivatives of chromic acid, or manganese dioxide or mixtures of these compounds are very suitable oxidising agents, as they are readily available and have no effect on the terephthalic acid but only on the impurities.

If desired, a first purification may be made using a simple recrystallisation of the crude acid from water under pressure before subjecting the terephthalic acid to a further purification by the process of our present invention.

We have also found that if the crude terephthalic acid is first treated in aqueous solution under pressure with a reducing agent, which does not reduce the terephthalic acid itself, the impurities in the terephthalic acid are more readily oxidised by the subsequent oxidation treatment. As examples of reducing agents, we have found such substances as sodium hyposulphite, titanous sulphate, sulphur dioxide, hydrogen sulphide, nascent hydrogen and phosphorous acid are very suitable.

A sample of crude terephthalic acid was twice crystallised from a 4% solution in water at 240° C. The optical density of the product in 4% ammonia solution was 0.36. The optical density is an arbitrary figure based on 0.00 for 4% ammonia alone and measured at a wavelength of $380 \times 10^{-7}$ centimetres.

The following examples, in which all parts are by weight illustrate the superior results obtained by, but do not limit, our invention:

*Example 1*

A further sample of the same crude terephthalic acid referred to hereinbefore was twice crystallised from a 4% solution in water at 240° C. but on the second occasion 0.1% potassium permanganate was added to the water and the solution made slightly acid by the addition of 1% sulphuric acid. The optical density of the product was 0.26.

*Example 2*

The process of Example 1 was repeated using manganese dioxide instead of potassium permanganate. The optical density of the derived terephthalic acid was 0.30.

*Example 3*

The process of Example 1 was repeated using sodium permanganate. The optical density of the product was 0.27.

*Example 4*

The process of Example 1 was repeated using a solution containing 0.1% to sodium dichromate instead of the permanganate. The optical density of the derived terephthalic acid was 0.30.

*Example 5*

The process of Example 4 was repeated using potassium dichromate. The optical density of the derived terephthalic acid was 0.29.

*Example 6*

The process of Example 4 was repeated using chromium trioxide in place of sodium dichromate. The optical density of the derived terephthalic acid was 0.31.

*Example 7*

Another sample of the crude terephthalic acid used in Example 1 was first crystallised from water in a 4% solution, the solution also containing 0.1% titanous sulphate. The optical density measured as before gave a value of 1.5. When the product was crystallised a second time from 0.1% potassium permanganate solution, the resultant optical density was 0.04.

*Example 8*

The process of Example 7 was repeated using nascent hydrogen as the reducing agent and generated from zinc and sulphuric acid. The optical density of the derived terephthalic acid was 0.09.

*Example 9*

The process of Example 7 was repeated using sodium hyposulphite in place of titanous sulphate followed by an oxidation using potassium dichromate in place of potassium permanganate. The optical density of the derived terephthalic acid was 0.07.

*Example 10*

The process of Example 9 was repeated using 0.1% of stannous chloride in 1% hydrochloric acid as the reducing agent. The optical density of the derived terephthalic acid was 0.15.

*Example 11*

The process of Example 9 was repeated, the terephthalic acid being initially crystallised from water containing 0.1% of sulphur dioxide. The optical density of the derived terephthalic acid was 0.28.

*Example 12*

The process of Example 9 was repeated, the terephthalic acid being initially crystallised from 1% phosphorous acid. The subsequent oxidation was with potassium permanganate. The optical density of the derived terephthalic acid was 0.03.

Although the reducing agent, when combined with the oxidising agent, gives such a useful improvement we have found that no appreciable improvement is obtained using a reducing agent on its own.

The improvement obtained in the colour of the terephthalic acid is clearly reflected in the improved colour of polyesters made from the terephthalic acid.

What I claim is:

A process for decolorizing a crude product from the oxidation of para-substituted dialkyl aromatic compounds which consists essentially of terephthalic acid which comprises heating under pressure an aqueous solution of said crude acid to a temperature above 200° C., but below the decomposition temperature of such terephthalic acid, and in the presence of a small amount of a reducing agent selected from the group consisting of sodium hyposulfite, titanous sulfate, sulfur dioxide, hydrogen sulfide, nascent hydrogen, and phosphorous acid, cooling the solution and allowing the terephthalic acid to crystallize, heating under pressure an aqueous solution of said crystallized terephthalic acid to a temperature above 200° C., but below the decomposition temperature of such terephthalic acid, and in the presence of a small amount of an oxidizing agent selected from the group consisting of manganese dioxide, potassium permanganate, sodium permanganate, chromic acid, sodium dichromate and potassium dichromate, cooling the solution and allowing the decolorized terephthalic acid to crystallize therefrom.

References Cited in the file of this patent

UNITED STATES PATENTS

| 1,365,956 | Senderens | Jan. 18, 1921 |
| 1,945,032 | Demant | Jan. 30, 1934 |
| 2,154,626 | Koch | Apr. 18, 1939 |
| 2,245,528 | Loder | June 10, 1941 |
| 2,572,575 | Shafer et al. | Oct. 23, 1951 |
| 2,792,420 | Broich et al. | May 14, 1957 |

FOREIGN PATENTS

| 300,968 | Great Britain | July 18, 1929 |
| 623,836 | Great Britain | May 24, 1949 |
| 644,707 | Great Britain | Oct. 18, 1950 |
| 695,170 | Great Britain | Aug. 5, 1953 |

OTHER REFERENCES

British Intelligence Objectives Sub-Committee Final Report No. 666, Item No. 22, "I.G."

Farbenindustrie Verdingen, Manufacture of Phthalic Anhydride, Benzoic Acid, Etc., pages 5 and 6, May 10, 1955.